UNITED STATES PATENT OFFICE 2,658,019

PROCESS OF EXTRACTING BIOLOGICALLY ACTIVE MATERIAL

Sylvan E. Moolten, Highland Park, N. J., assignor to American Cholesterol Products, Inc., a corporation of New York No Drawing. Application April 24, 1948, Serial No. 23,137

3 Claims. (Cl. 167—74)

The present invention relates to a biologically-active material which is capable of reducing the number and adhesive index of the blood platelets of living human and lower animals and to a process for preparing the same from animal starting material. The present application is a continuation in part of my co-pending application Serial Number 614,819, filed September 6, 1945.

In that application I have described two antagonistic factors affecting the number and adhesiveness of the blood platelets, which I have designated as "thrombocytosin" and "thrombocytopen." Thrombocytosin is characterized by its ability to increase the number and adhesiveness of the blood platelets of living animals, whereas thrombocytopen has the opposite effect. In a normal or well animal these antagonistic factors, which apparently are generated or controlled by the spleen, are in a suitably balanced state but in the case of dysfunction resulting from certain disease or other abnormal conditions, the natural balance is disturbed so that one or the other of these factors may predominate with a resultant alteration in the number and adhesiveness of the blood platelets for that animal. This alteration may also arise from other causes such as the administration of various drugs and other forms of therapeutic treatment including extensive X-ray therapy and extensive surgical operations.

The occurrence and preparation of both the thrombocytosin and the thrombocytopen factors are generally described and claimed in my aforesaid co-pending application but with especial reference to thrombocytosin; the present application is, therefore, primarily directed to thrombocytopen and its preparation. My investigations have revealed that the human spleen in cases of purpura hemorrhagica is particularly high in thrombocytopen as contrasted with normal human or beef spleen and spleens in cases of other diseased conditions. This is illustrated by the following table:

| Assay Material | Thrombocytopen (units/gram) |
|---|---|
| Normal human spleen (4 cases) | 0.70± 0.35 |
| Normal beef spleens (pooled) | 0.35 |
| Spleen, Hodgkin's disease (2 cases) | 0.0–0.16 |
| Spleen, aplastic anemia, hemosiderosis | 0.14 |
| Spleen, monocytic leukemia | 0.007 |
| Spleen, purpura hemorrhagica | 7.0+ |

Thrombocytopen is not, however, found only in normal or diseased spleen since it occurs in various quantities in other animal materials such as urine and egg yolk. A unit (bioassay unit) of thrombocytopen, as the term is used herein, means that amount of thrombocytopen which will lower the platelet count of a rabbit by 100,000 per cubic millimeter of blood in a period not exceeding eight hours when an aqueous suspension thereof is injected intramuscularly.

In addition to considerations involving the number of blood platelets, the adhesiveness of those platelets has also been found to be an important and significant factor. A concentration of thrombocytopen of one milligram per cent reduces the adhesiveness of the platelets in vitro from a normal or high index (1.2–4.0) to less than 1.0 as measured by the glass wool filter method, constituting thereby an alternate method of assay. While thrombocytopen does not appreciably affect the coagulability of the blood, it sharply suppresses the adhesiveness of the platelets both in the rabbit and in the human subject in vitro and in vivo in addition to reducing the platelet count in vivo (in the rabbit and in the human). The adhesive index, as that term is herein employed, means the quotient obtained by dividing the ratio of blood platelets to red blood cells before and after a given sample of citrated blood (0.38% sodium citrate) has been passed through a glass wool filter standardized for this procedure. While, in general, I have found that the adhesive index and the platelet count tend to run parallel to one another, this is by no means a constant difference as divergences appear, for example, following an operation or injury, at which time the adhesive index is relatively high regardless of the total platelet count and proves to be a more reliable warning of impending thrombosis than fluctuations in the total platelet count or the coagulability of the blood.

In order to suppress propagation of an already existing thrombosis or the development of a new thrombus within the blood vessels, thrombocytopen is administered, thus averting fatal embolism or other complication of thrombosis, such as that occuring post-operatively in patients subject to extensive, protracted surgery especially on the lower abdomen, pelvis and lower extremities. This is especially applicable in obese persons or in persons who from their family or past personal history have evidenced a tendency to thrombosis. In the latter category are patients with such a tendency as the result of thermal and/or mechanical injury as in the case of extensive burns and fractures and in child-bearing women subjected to Caesarian section. The administration of thrombocytopen is further useful in overcoming conditions of increased tendency to thrombosis due to an excess number of blood platelets such as in idiopathic thrombocytosis or polycythaemia vera wherein thrombosis may affect veins or arteries in various parts of the body including the brain and heart, and in coronary arterial occlusion in order to diminish the tendency to progressive coronary arterial thrombosis or the formation of mural thrombi within the cardiac chambers which might otherwise result in an extremely serious or fatal outcome.

Thrombocytopen, when prepared as herein described, is obtained in the form of relatively short and blunt, colorless or water-white crystals which are substantially less soluble in cold methanol than thrombocytosin and which therefore separate first on slow evaporation of a mixture of the two such as occurs where the spleen is the source of the primary extract. Thrombocytopen has a melting point which is close to that of cholesterol and is capable of being selectively adsorbed by cholesterol in a relatively constant proportion, which constitutes not only a physical characteristic of thrombocytopen but which also can be taken advantage of in its preparation and purification. Thrombocytopen forms an insoluble digitonide and is believed to have a steroid or lipoid constitution.

Extraction of animal spleens with acetone, I have discovered, leads to an extract which contains both the thrombocyte-increasing factor (thrombocytosin) and the thrombocyte-lowering factor (thrombocytopen). Separation of these individual materials has been accomplished by methods involving concentration by extraction with ether and subsequent fractional crystallization. Methanol is a satisfactory solvent for accomplishing this separation. Thrombocytopen can be demonstrated in the fraction which is less soluble in cold methanol and in the first harvest of crystals obtained from a methanol solution on slow evaporation. Thrombocytosin can be demonstrated in the readily soluble fraction and in the crystals formed upon further evaporation.

Crude separation of the two mutually antagonistic factors may also be achieved by suspending the primary acetone-ether extract in saline solution and filtering. The milky dispersion which passed the filter was found to be rich in thrombocytosin. The material left on the filter formed a flocculent suspension in saline solution which was found to be rich in thrombocytopen.

In a few instances, in working with the separatory methods described above, discordant results were obtained which suggested imperfect separation of the two mutually antagonistic factors. A reliable differential extraction and separation procedure was established by the introduction of the step of emulsifying the extracts with alkali. The primary residue obtained by drying the acetone extract of ground spleen was shaken with ether, filtered and evaporated. The ether-soluble residue is shaken with, and permitted to stand with, a warm aqueous sodium hydroxide solution, then acidified with a slight excess of hydrochloric acid and again extracted with ether. The product may be separated into two fractions exhibiting contrary effects on the blood platelet count by either of the assay procedures outlined above.

By following the foregoing procedures, a crystalline fraction of surprising potency is secured which exhibits marked thrombocytopen activity in rabbits in doses of 5 milligrams. When injected in this amount intramuscularly into a rabbit the thrombocytopen fraction consistently lowered the platelet count by some 100,000 platelets per cu. mm.

As an illustration of a presently preferred process for the differential recovery of the two mutually antangonistic thrombocytotropic factors the following description of a particular extraction operation is given:

A ground bovine spleen was extracted with 5 volumes of reagent acetone for several days. At the end of this period the material was filtered and the acetone distilled off leaving a brownish gummy residue. This residue was shaken with ether, filtered, and the ether was then evaporated from the filtrate. The residue was shaken with enough aqueous sodium hydroxide to make the mixture just purple to phenolphthalein, and kept in a warm room from 12 to 15 hours, then acidified with a slight excess of hydrochloric acid and extracted with ether in a separatory funnel. The ethereal solution was evaporated to dryness and the residue was re-extracted with acetone, dried, dissolved in methyl alcohol and set aside at room temperature to evaporate slowly. As crystals formed on the side of the beaker the mother liquor was decanted for a similar period of evaporation into each of several other evaporating beakers in succession until only an amorphous product was obtained. In some cases recrystallization from methyl alcohol will be necessary in order to obtain colorless crystals. A low-power loupe was employed in grouping crystals of like type. It was found that the crystals could readily be classified by inspection into distinct groups. The crystals of each type were collected separately, dissolved in ether, dried, weighed and re-dissolved in acetone to make up separate doses of known amount for bioassay and added to 10 cc. quantities of sterile 0.85 saline solution. The acetone was distilled off in vacuo at 40° C. until no trace of its odor could be detected. The resulting cloudy or flocculent suspension was shaken thoroughly before injection.

Further purification was subsequently achieved when it was discovered that the crystalline material consisted largely of pure cholesterol upon which the active factors had become adsorbed. The procedure employed to establish this fact consisted in vigorous saponification of the original material in boiling alcoholic potassium hydroxide solution. When the mixture was permitted to stand overnight in the refrigerator following this treatment virtually all the cholesterol separated out as crystals. Bioassay of these crystals revealed their complete inactivity. The fatty acids were then removed by addition of barium chloride and they also showed absence of activity following their recovery from the insoluble barium soaps. The active concentrates were recovered from the residual clear solution by ether extraction.

The physiological effects of thrombocytopen were investigated by intramuscular injections into rabbits of extracts prepared in accordance with the preferred recovery procedure described above without the elimination of the adsorbent cholesterol crystals. Thrombocytopen, as thus isolated, produced a fall in thrombocyte count which was roughly proportional to the doses given. Individual rabbits were found to differ to some extent in their sensitivity to thrombocytopen.

There were no evidences of toxicity in rabbits given physiologically effective doses of thrombocytopen one or more times daily successive days for periods of a week or longer. No significant changes occurred either in the erythrocyte or leukocyte count. Purpura was not observed in any of the rabbit tests for thrombocytopen, although in one case there was a prolongation of bleeding time following a large dose of thrombocytopen in peanut oil. Thrombocytopen sensitivity was retained undiminished after repeated tests with single doses extending over a considerable period. A similar result was obtained in a healthy human volunteer who took six 50 mg. doses orally during a period of 21 hours.

While it had been previously recognized to some extent in the literature that injections of spleen extracts gave erratic and inconsistent results when tested in rabbits, it was not recognized that such was probably due to the presence of both a thrombocyte-increasing and a thrombocyte-reducing factor, particularly in those cases in which the thrombocyte-increasing factor (thrombocytosin) predominated and therefore obscured the presence and effect of the other factor. Since no one had heretofore effected a separation of the two factors, the meaning and significance of the prior results proved both confusing and lacking in utility. The present discovery, however, not only constitutes a sound explanation of previous observations and results but further sheds considerable light upon the physiological role of the spleen.

Thrombocytopen may be administered orally in capsules containing the biologically active fraction in crystal form in the desired amount or may be intramuscularly injected in the form of a suspension in distilled water, physiological saline or a vegetable oil such as peanut oil. It is prepared for use, for example, by dissolving the crystals in acetone, mixing the same thoroughly with the vehicle and then evaporating the acetone in vacuo. Thrombocytopen is free from toxic effects.

In obtaining thrombocytopen or the thrombocytopen-active fraction from urine, I first evaporate the urine to dryness and then proceed as in the methods above described. I may, however, extract the urine with a solvent for fats and then evaporate the fatty extract to dryness, whereas the procedure is subsequently the same as above described. Thus, in using a liquid animal material or extract as the source of thrombocytopen, a preliminary drying or extraction and drying step is first carried out.

It will be appreciated that the invention is not limited to the precise procedures above described but that variations may be made both in such procedures and in the reagents employed without departing from the essential features of the invention. The procedures above set forth are for the purpose of illustration rather than of limitation. For example, the primary extraction of the raw animal starting material which has been described as being accomplished by means of acetone may be carried out upon powdered dried spleen and/or with other lipoid solvents such as methyl ethyl ketone, pyridine, methyl alcohol and mixtures of two or more of such solvents. Nor am I limited in the manner of eliminating cholesterol from the concentrate, as such may be effected in any suitable or desired manner. The invention is rather that defined by the appended claims.

I claim:

1. A process for preparing a biologically-active material adapted to decrease the blood platelet count of a living animal when injected thereinto which comprises extracting animal spleen with acetone, separating the liquid extract thus produced from insolubles, distilling off the acetone to produce a residue, extracting said residue with ether to form an ether solution, separating the ether solution from ether-insoluble matter, evaporating the ethereal solvent to produce a residue, shaking such residue with aqueous caustic soda, neutralizing the residual free alkali with acid and then extracting the same with ether to produce a second ether solution, separating the second ether solution from ether-insoluble matter, evaporating the second ether solution to dryness, extracting the residue thus produced with acetone, separating the acetone-soluble material from insolubles, drying the acetone extract thus formed, dissolving it in methanol and evaporating the methanol solution slowly at room temperature to produce crystalline thrombocytopen.

2. A process for preparing a biologically-active material adapted to decrease the blood platelet count of a living animal when injected thereinto which comprises extracting egg yolks with acetone, separating the liquid extract thus produced from insolubles, distilling off the acetone to produce a residue, extracting said residue with ether to form an ether solution, separating the ether solution from ether-insoluble matter, evaporating the ethereal solvent to produce a residue, shaking such residue with aqueous caustic soda, neutralizing the residual free alkali with acid and then extracting the same with ether to produce a second ether solution, separating the second ether solution from ether-insoluble matter, evaporating the second ether solution to dryness, extracting the residue thus produced with acetone, separating the acetone-soluble material from insolubles, drying the acetone extract thus formed, dissolving it in methanol and evaporating the methanol solution slowly at room temperature to produce crystalline thrombocytopen.

3. A process for preparing a biologically-active material adapted to decrease the blood platelet count and adhesiveness of a living animal when administered to such animal which comprises extracting with acetone a pre-dried urine fraction containing the biologically-active material, separating the liquid extract thus produced from insolubles, distilling off the acetone to produce a residue, extracting said residue with ether to form an ether solution, separating the ether solution from ether-insoluble matter, evaporating the ethereal solvent to produce a residue, shaking such residue with aqueous caustic soda, neutralizing the residual free alkali with acid and then extracting the same with ether to produce a second ether solution, separating the second ether solution from ether-insoluble matter, evaporating the second ether solution to dryness, extracting the residue thus produced with acetone, separating the acetone-soluble material from insolubles, drying the acetone extract thus formed, dissolving it in methanol and evaporating the methanol solution slowly at room temperature to produce crystalline thrombocytopen.

SYLVAN E. MOOLTEN.

(References on following page)

References Cited in the file of this patent

UNITED STATES PATENTS

| Number | Name | Date |
|---|---|---|
| 1,314,321 | Fraenkel et al. | Aug. 26, 1919 |
| 1,437,951 | Archibald | Dec. 5, 1922 |
| 1,796,027 | Iscovesco | Mar. 10, 1931 |
| 1,916,478 | Hohlweg | July 4, 1933 |
| 1,967,351 | Doisy | July 24, 1934 |
| 2,171,320 | Lautenschlager et al. | Aug. 29, 1939 |
| 2,363,549 | Rabinowitz | Nov. 28, 1944 |

OTHER REFERENCES

A preliminary report on a platelet-reducing substance in spleen by Troland and Lee in Bull. John Hopkins Hospital, pages 62, 85 to 86, 1938, abstracted in Chemical Abstracts, volume 32, 1938, column 3018.

Further studies of platelet-reducing substances in splenic extracts by E. P. Cronkite, Ann. Internal Med. 20, 52 to 62, 1944, abstracted in Chemical Abstracts, volume 38, 1944, column 1278.

The effect of splenic extract on blood-coagulation time, thrombocytes and erthrocytes by Haenlein and Schliephake Klin. Wochschr. 14, 79 to 83, 1935, abstracted in Chem. Abs., vol. 29, 1935, col. 4058.

Suto-Nagy: Journal Biol. Chem., December 1944, pages 433 to 441.

Tocantins: "Proc. Soc. Exptl. Biol. and Med." 42, page 485, 1939.